United States Patent
Johnson

(10) Patent No.: US 9,905,989 B1
(45) Date of Patent: Feb. 27, 2018

(54) METHOD FOR HIGH-RATE FIBER LASER MANUFACTURING

(71) Applicant: BAE SYSTEMS INFORMATION AND ELECTRONIC SYSTEMS INTEGRATION INC., Nashua, NH (US)

(72) Inventor: Benjamin R. Johnson, Nottingham, NH (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 0 days.

(21) Appl. No.: 15/218,411

(22) Filed: Jul. 25, 2016

(51) Int. Cl.
| | |
|---|---|
| *H01S 3/067* | (2006.01) |
| *G02B 6/255* | (2006.01) |
| *H01S 3/094* | (2006.01) |
| *H01S 3/16* | (2006.01) |
| *G02B 6/14* | (2006.01) |
| *H01S 3/0941* | (2006.01) |

(52) U.S. Cl.
CPC .......... *H01S 3/094042* (2013.01); *G02B 6/14* (2013.01); *G02B 6/255* (2013.01); *H01S 3/0675* (2013.01); *H01S 3/06733* (2013.01); *H01S 3/09415* (2013.01); *H01S 3/1603* (2013.01)

(58) Field of Classification Search
CPC .................................................. H01S 3/0675
See application file for complete search history.

(56) References Cited

U.S. PATENT DOCUMENTS

| | | | |
|---|---|---|---|
| 6,612,754 B2 | 9/2003 | Dahmani et al. | |
| 6,705,771 B2 | 3/2004 | Jiang et al. | |
| 8,433,161 B2 | 4/2013 | Langseth et al. | |
| 9,203,205 B2* | 12/2015 | Kitabayashi | ........ H01S 3/06754 |
| 9,360,625 B2 | 6/2016 | Creeden | |
| 2001/0010696 A1* | 8/2001 | Bufetov | .................. H01S 3/302 372/3 |
| 2003/0161357 A1* | 8/2003 | Bolshtyansky | ... H01S 3/094003 372/6 |
| 2007/0133625 A1* | 6/2007 | Ahn | ....................... H01S 3/0675 372/6 |
| 2009/0116809 A1* | 5/2009 | Dianov | ............. C03B 37/01413 385/142 |
| 2012/0057220 A1* | 3/2012 | Langseth | ............... H01S 3/0675 359/341.3 |
| 2013/0322470 A1* | 12/2013 | Creeden | ................ H01S 3/0675 372/6 |

(Continued)

FOREIGN PATENT DOCUMENTS

| | | |
|---|---|---|
| CA | 2 002 986 | 6/1990 |
| WO | 2015/102697 A2 | 7/2015 |
| WO | WO 2015102697 A3 * | 9/2015 ........... H01S 3/0675 |

*Primary Examiner* — Michelle R Connelly
(74) *Attorney, Agent, or Firm* — Davis & Bujold, PLLC

(57) ABSTRACT

A method of manufacturing a high-power fiber laser by forming a first assembly of fiber optic components on a common first fiber; forming a second assembly of other fiber optic components on a common second fiber; forming a further fiber optic component on a third optical fiber; connecting the first fiber to the third optical fiber by a first splice to fix the first assembly of fiber optic components to the further fiber optic component; and connecting the third optical fiber to the second fiber by a second splice to fix the second assembly of fiber optic components to the further fiber optic component.

8 Claims, 3 Drawing Sheets

(56) References Cited

U.S. PATENT DOCUMENTS

| | | |
|---|---|---|
| 2014/0211818 A1 | 7/2014 | Hou et al. |
| 2015/0372442 A1* | 12/2015 | Dong ................. H01S 3/06708 372/6 |
| 2016/0099538 A1 | 4/2016 | Johnson et al. |
| 2016/0268762 A1* | 9/2016 | Johnson ................ H01S 3/0675 |

* cited by examiner

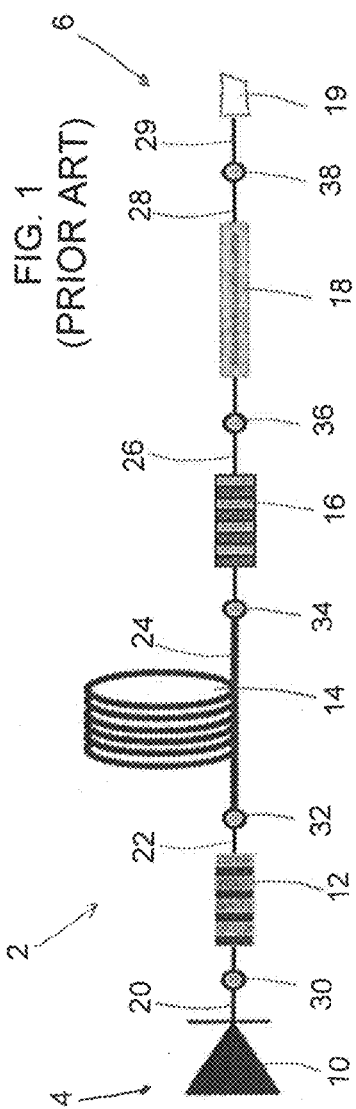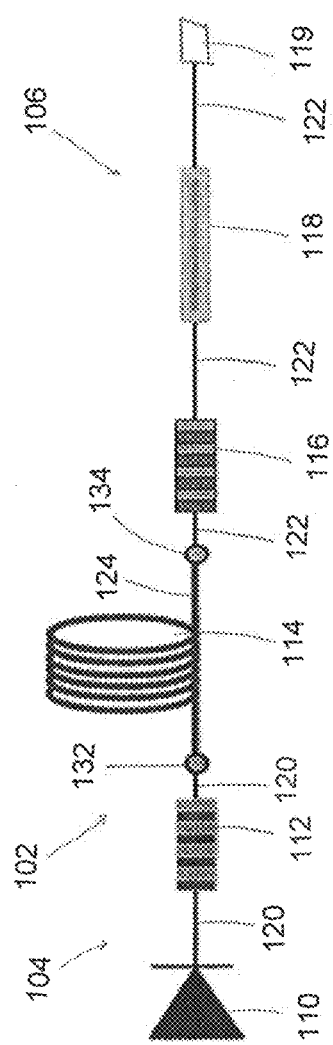

METHOD FOR HIGH-RATE FIBER LASER MANUFACTURING

FIELD

The present disclosure relates to an improved method of manufacturing high-power fiber lasers from three or less separate optical fibers in order to minimize the number of splices which are required in order to manufacture the high-power fiber laser.

BACKGROUND

The prevalence of fiber lasers in the medical, military and industrial fields has increased the overall demand for high-power fiber lasers. As the number of fiber lasers needed by various industries increases, the manufacturers of fiber lasers requires improved techniques to efficiently manufacturing such high-power fiber lasers to meet the increasing demand.

A number of fiber lasers are known in the prior art, for example U.S. Pat. No. 9,360,625 B2, International Pub. No. WO 2015/102697 A2 and U.S. Pat. Pub. No. 2016/0099538 A1. Also known in the prior art are methods and devices for splicing optical fibers such as, for example U.S. Pat. No. 6,612,754.

A typical prior art laser is illustrated in FIG. 1 comprises of a number of individual fiber based components. In the illustrated example, the assembled fiber laser 2 comprises six individual components which are all coupled to one another in a desired configuration and arrangement. The components are arranged, from a pump end 4 of the fiber laser 2 to a terminus end 6 thereof, in the following order: a laser diode module 10, a high-reflector fiber Bragg grating 12, a rare-earth doped fiber 14; a partial-reflector fiber Bragg grating 16, a cladding mode stripper 18 and a fiber cable connector 19. As each of these components as well as their associated purpose and functions are generally well known in the art, further details concerning the same are not provided or believed be necessary.

As is conventional art, these components are manufactured or fabricated individually, i.e., independent of one another. Laser diode modules can include injection laser diodes and optically pumped semiconductor lasers. These diode modules are electrically or optically pumped semiconductor lasers that can control the flow of electrical or light energy, convert the electrical energy to light and amplify or increase the light energy before emitting the light energy via an un-doped passive optical fiber.

A fiber Bragg grating is typically fabricated by optically machining an un-doped passive optical fiber. This optically machining procedure involves illuminating the core material of the fiber, which in turn induces some structural changes in the fiber and thus modifies the refractive index of the fiber. Fiber Bragg gratings are used to alter input light in the optical fiber by reflecting/refracting differing ranges of wavelengths of the input light. For example, a high-reflector fiber Bragg grating allows for a greater amount, e.g., 99% of the input light to pass through the high-reflector fiber Bragg grating, i.e., only a small percentage of the wavelengths of the input light are prevented from passing through a high-reflector fiber Bragg grating. In contrast, a partial-reflector fiber Bragg grating allows a smaller amount, e.g., 80% of the input light, to pass through the partial-reflector fiber Bragg grating. A partial-reflector fiber Bragg grating increases percentage of the wavelengths of the input light that are prevented from passing through the partial-reflector fiber Bragg grating.

Rare-earth doped fibers are formed from un-doped passive optical fiber which are doped with laser-active rare earth ions such as neodymium, ytterbium, erbium and thulium to name a few. These ions absorb light which excites them into metastable levels. This facilitates amplification of the light, which was input into the doped fiber, by stimulated emission.

Generally the term cladding mode stripper refers to conventional methods and means which cause light propagating in the cladding (i.e., not the core in which waveguide modes are desired) to propagate out of the cladding. To achieve this, the cladding mode stripper absorbs or redirects the stripped light. Cladding mode strippers in high-power fiber amplifiers are made from a double-clad fiber. The differences in the properties or characteristics of the core and the clads of the fiber facilitate the redirection and adsorption of stripped light.

Fiber connectors are generally used as the terminations of optical fiber cables and provide nonpermanent connections between fiber-coupled devices. Fiber connectors generally include a floating ferrule, into which an un-doped fiber is inserted.

The above described components are each either conventionally coupled to or formed with distinct individual fibers. That is, the laser diode module 10 is formed with optical fiber 20. In addition, the high-reflector fiber Bragg grating 12 is also conventionally formed with another optical fiber 22. Further, the rare-earth doped fiber 14 is formed with a still further fiber 24. Next, the partial-reflector fiber Bragg grating 16 is conventionally formed with an optical fiber 26. The cladding mode stripper 18 is then formed with still another optical fiber 28. Lastly, the fiber cable connector 19 is formed with a further fiber 29. These components are formed with or utilize the same type of optical fiber at the start of their production. The individual fibers used in the fabrication of the different components are typically double-clad, passive optical fibers which have a polymer cladding that provides a multimode waveguide for the pump energy.

In order to assemble the fiber laser 2 illustrated in FIG. 1, a fiber end of a first component to a fiber end of an adjacent second component and then splicing a fiber end of a third component to the opposite fiber end of the second component and so on until all the components are spliced together end to end in the desired order. The fiber ends of the components are spliced together by means of fusion splices. The process of fusion splicing the ends of the fibers of two adjacent components generally includes the steps of: stripping the fibers, cleaning the fibers, cleaving the fibers, splicing the fibers, testing the connection and protecting the connection.

In more detail, the splicing process begins by preparing the fiber ends of at least two components to be fused together. This requires that all of the protective coatings on the ends of the fibers of the at least two components be removed or rather stripped. Then the bare fiber ends are cleaned with an alcohol and wipes, being careful to ensure that moisture is not attracted to the bare fiber ends. Subsequently, the bare fiber ends are cleaved, using a "score-and-break" method to ensure that the faces of the fiber ends are perfectly flat and perpendicular to the axis of the fibers. Then, the two cleaved fibers are automatically aligned in the x, y, z planes by means of a fusion splicer so that, depending on the fusion splicer being utilized, the cores or the cladding of the fibers are aligned. Once aligned, the fiber ends of the adjacent components are heated and melted by a heating element and then fused together so as to connect the fibers end to end. The splices are then evaluated for example to ensure that the completed splice is strong enough to withstand damage during shipping, handling and extended use. Finally, the bare area of the fused fibers is protected by re-coating the area of the fibers with something such as a heat shrinkable membrane.

Although, splicing is an acceptable means for coupling the fibers of different components, it is recognized that connections of fibers that are made by fusion splicing have a number of potential drawbacks.

It is known for example that, if the surface of the fiber at or near the splice becomes compromised in any manner, the mechanical strength of the splice and its surroundings may be below that of the normal bare fiber. Such damage can include surface scratches which can be caused during the removal of the protective coating at the ends of the fiber. Damage can also be caused after splicing such as during the later application of a protective coating. In addition, faulty fusion splicing of fibers is known to negatively impact the transmission of light energy through fiber lasers thus reducing the effectiveness, efficiency and durability of the components and thus the fiber laser. Further, equipment for fusion splicing is fairly expensive, and may require extensive training.

Fiberoptic devices and systems ubiquitously employ fused splices to join fibers. As noted, each splice presents opportunities for optical and mechanical degradation of the device. Additionally, every splice takes time, equipment and resources to execute and packaging strategies that account for service loops and splice placement. The quality, cost and size of fiberoptic devices can also depend heavily on the total number of splices in the device. In FIG. 1 each splice is represented by an individual circle which connects the fibers of two adjacent components. The fiber laser 2 comprises six different components each having their own fiber. The fiber laser 2 thus requires a total of five splices 30, 32, 34, 36, 38 to connect the laser diode module 10, the high-reflector fiber Bragg grating 12, the rare-earth doped fiber 14; the partial-reflector fiber Bragg grating 16, the cladding mode stripper 18, and fiber cable connector 19. There is a strong motivation to reduce the number of splices required to fully assemble the fiber laser 2, as this would increase product quality and reliability and significantly reduce manufacturing costs. Considering the generally high cost of laser materials (mainly doped gain media and pump energy sources) it is advantageous to minimize touch labor on those materials so as to mitigate labor-based and poor-product-quality costs. For high-power fiber lasers, eliminating optical interfaces such as those caused by splices is critical as splices are sources for degradation in reliability, decreased performance and increased manufacturing costs.

SUMMARY

Wherefore, it is an object of the present system to overcome the above-mentioned shortcomings and drawbacks associated with the conventional art.

Another object is to provide a method of manufacturing high-power fiber lasers comprising multiple components with as few splice connections as possible so as to increase product quality and reliability and significantly reduce manufacturing costs.

A still further object is to manufacture a high-power fiber laser comprising a laser diode module, a high-reflector fiber Bragg grating, a rare-earth doped fiber, a partial-reflector fiber Bragg grating, a cladding mode stripper, and a fiber cable connector with only two splices by combining the discrete fiber components into larger, integrated assemblies as fiber prescriptions allow.

A further object is to fabricate component assemblies using a single length of fiber. As the fiber of the individual fiber components of high-power fiber lasers of the type described above, use strands of the same un-doped passive optical fiber, pre-assembly of the front-end and back-end of the fiber laser onto single fibers reduces the number of splices required for assembly. For the front end of a high-power fiber laser, a diode-coupling fiber and a high-reflector fiber Bragg grating may be combined as a splice-free assembly by forming these components on a single length of optical fiber. At the terminus end of the high-power fiber laser, a partial-reflector fiber Bragg grating, a cladding mode stripper and a fiber cable connector may be combined as an assembly on a single length of fiber. With these components formed in assemblies on individual strands, connecting these to a rare-earth doped fiber only requires two splices for full assembly of the high-power fiber laser.

The present disclosure also relates to a method of manufacturing a high-power fiber laser comprising forming a first assembly of at least two fiber optic components that are manufactured on a single common first optical fiber. Forming a second assembly of at least two fiber optic components that are manufactured on a single common second optical fiber. Forming a further fiber optic component on a single third fiber. Aligning a trailing end of the single common first optical fiber with a leading end of the third fiber and splicing the trailing end of the single common first optical fiber to the leading end of the third fiber, and aligning a leading end of the single common second optical fiber with a trailing end of the third fiber and splicing the leading end of the single common first optical fiber to the trailing end of the third fiber to form the high-power fiber laser.

The present disclosure also relates to a high-power fiber laser having a first assembly of fiber optic components that is formed on a splice free common first optical fiber. A second assembly of other fiber optic components is formed on a splice free common second optical fiber. A further fiber optic component is formed on a splice free third optical fiber. A first splice integrally connects the first optical fiber to the third optical fiber to fix the first assembly of fiber optic components to the further fiber optic component. A second splice integrally connects the third optical fiber to the second optical fiber to fix the second assembly of fiber optic components to the further fiber optic component.

As used in this description and the appended claims the term "splice free" referring to an optic fiber is intended to mean a continuous optic fiber that has no splices, cuts, joints, unions or the like from one end of the optic fiber to the other end.

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. The invention will now be described, by way of example, with reference to the accompanying drawings in which:

FIG. 1 is a fiber laser assembled in a known manner;

FIG. 2 is a fiber laser assembled in a method according to one embodiment;

DETAILED DESCRIPTION

Figure 2B:
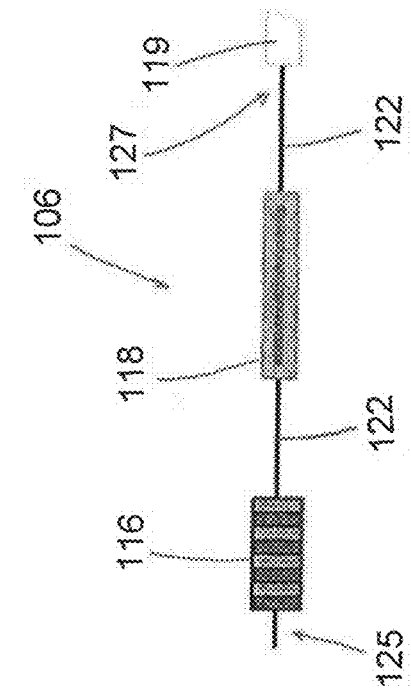
FIG. 2B is a second assembly of the fiber laser assembled in a method according to one embodiment.

The present disclosure will be understood by reference to the following detailed description, which should be read in conjunction with the appended drawings. It is to be appreciated that the following detailed description of various embodiments is by way of example only and is not meant to limit, in any way, the scope of the present system.

Turning now to FIGS. 2, 2A, 2B and 2C, a brief description concerning the various components will now be briefly discussed. As can be seen in this embodiment, a high-energy fiber laser 102 has a pump end assembly 104, which typically comprises both a laser diode module 110 and a high-reflector Bragg grating 112 as well as a terminus end assembly 106, which typically comprises a partial-reflector fiber Bragg grating 116, a cladding mode stripper 118 and a fiber cable connector 119. The high-energy fiber laser 102 further includes a rare-earth doped fiber 114 which is arranged between the pump end assembly 104 and the terminus end assembly 106. In contrast to the known fiber laser 2 shown in FIG. 1, in order to reduce the number of splices required to manufacture the high-energy fiber laser 102, as noted above, the components used to manufacture the high-energy fiber laser 102 are formed in assemblies on a single optical fiber.

Figure 2C:
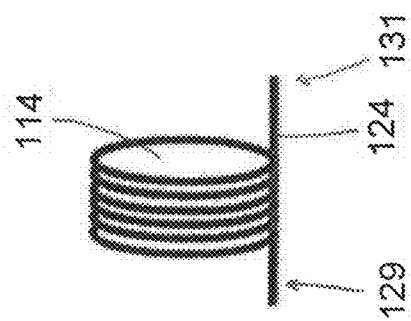
FIG. 2C is a fiber laser component of the fiber laser assembled in a method according to one embodiment.
Figure 2A:
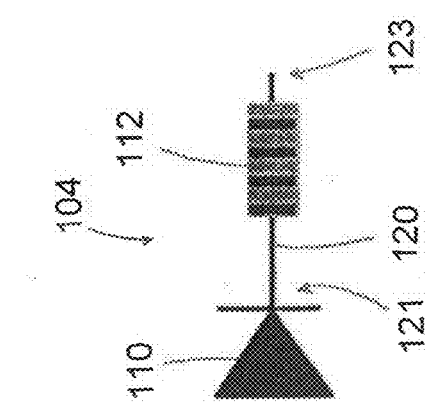
FIG. 2A is a first assembly of the fiber laser assembled in a method according to one embodiment.

As shown in FIGS. 2, 2A, the pump end assembly 104 of the high-energy fiber laser 102 comprises a single first splice free optic fiber 120 on which both the laser diode module 110 and the high-reflector fiber Bragg grating 112 are sequentially formed as an assembly, independent of the remaining components of the high-energy fiber laser 102. Similarly, as shown in FIGS. 2 and 2B, the terminus end assembly 106 of the high-energy fiber laser 102 comprises a second single optic fiber 122 on which the partial-reflector fiber Bragg grating 116, the cladding mode stripper 118 and the fiber cable connector 119 are all sequentially formed as an assembly, independent of the remaining components of the high-energy fiber laser 102. As shown in FIG. 2C the rare-earth doped fiber 114 is formed independent of the other components or assemblies on a splice free third optic fiber 124. In essence, the high-energy fiber laser 102 is assembled by splicing one component 114 with two assemblies of components 104, 106 by means of only two splices 132, 134 which are illustrated as circles in FIG. 2.

Figure 3:
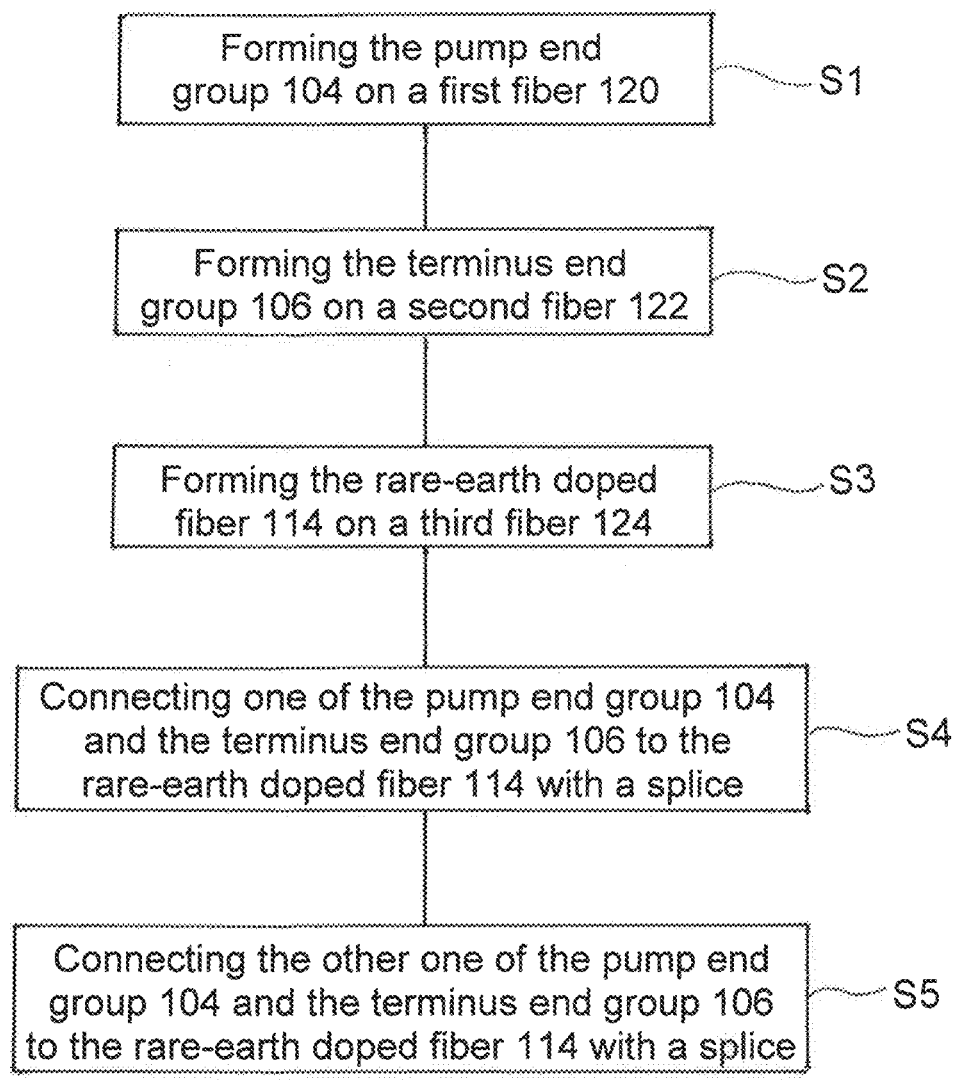
FIG. 3 is a flow diagram illustrating the method according to one embodiment.

With reference to FIGS. 2, 2A-2C and the flow diagram of FIG. 3, a method of forming the high-power fiber laser 102 will now be explained in detail. In step S1 according to the method, the pump end assembly 104 is formed by coupling, forming or connecting a laser diode at or adjacent a leading end 121 of an un-doped first passive optical fiber 120 in order to form the pump diode 110. A high-reflective fiber Bragg grating 112 is fabricated by optically machining an intermediated section of the fiber 120 which is downstream from the pump diode 110 and spaced from a trailing end 123 of the un-doped first passive optical fiber 120. It is to be understood that the steps for forming the pump diode 110 and fabricating the high-reflective fiber Bragg grating 112 can be accomplished in the any order, i.e., the high-reflective fiber Bragg grating 112 can be optically machined into the un-doped first passive optical fiber 120 first which is then followed by the pump diode 110 being be coupled to the un-doped first passive optical fiber 120 or vice versa. It is to be appreciated that the overall length of the un-doped first passive optical fiber 120 should be sufficiently long enough to ensure that both the pump diode 110 and the high-reflective fiber Bragg grating 112 can be made using the same piece of first passive optical fiber as well as having sufficient amount of optical fiber to facilitate splicing of a trailing end 123 of the pump end assembly 104 with the rare-earth doped fiber 114.

Before commencing manufacture or fabrication of the pump end assembly 104, the length of the un-doped first passive optical fiber 120 should be sufficiently long enough to facilitate manufacturing both the pump diode 110 and the high-reflective fiber Bragg grating 112 as well as leaving a remaining amount of sufficient optical fiber to facilitate splicing of a trailing end 123 of the pump end assembly 104 with the rare-earth doped fiber 114. For example, the length of the un-doped first passive optical fiber 120 typically ranges approximately between 100 cm and 1,000 cm. In one example, the length of the un-doped first passive optical fiber 120, utilized to manufacture or fabricate of the pump end assembly 104, is approximately 200 cm long.

During S2 of the method, the terminus end assembly 106 is formed on an un-doped second passive optical fiber 122 by optically machining the partial-reflector fiber Bragg grating 116 into an upstream end of the un-doped second passive optical fiber 122 adjacent a leading end 125 thereof. The cladding mode stripper 118 is formed in an intermediate section of the un-doped second passive optical fiber 122 by providing the core and the clads of this downstream intermediate section portion with the desired properties or characteristics necessary to facilitate the desired redirection and adsorption of the stripped light. A fiber cable connector 119 is attached to a trailing end 127 of the un-doped second passive optical fiber 122, i.e., downstream of the cladding mode stripper 118, in order to provide a mechanism for connecting the assembled fiber laser 102 to a desired apparatus.

As noted above, forming the terminus end assembly 106 with the partial-reflector Bragg grating 116, the cladding mode stripper 118 and the fiber cable connector 119 with the fiber 122 can be accomplished in any order. That is to say, the terminus end assembly 106 may be formed in any of the following orders: a) first the Bragg grating 116 is optically machined into the un-doped second passive optical fiber 122, then either one of cladding mode stripper 118 or the fiber cable connector 114 is formed with the un-doped second passive optical fiber 122 and, thirdly, the other of cladding mode stripper 118 and the fiber cable connector 114 is formed with the un-doped second passive optical fiber 122; b) first the cladding mode stripper 118 is formed with the un-doped second passive optical fiber 122, then either one of the Bragg grating 116 or the fiber cable connector 114 is formed with the un-doped second passive optical fiber 122, and lastly the other of the Bragg grating 116 and the fiber cable connector 114 is formed with the un-doped second passive optical fiber 122; and c) the fiber cable connector 114 is formed with the un-doped second passive optical fiber 122, then either one of the Bragg grating 116 or the cladding mode stripper 118 is formed with the un-doped second passive optical fiber 122, and lastly the other of the Bragg grating 116 and cladding mode stripper 118 is formed with the fiber 122.

In the same manner as the pump end assembly 104 described above, the order in which the terminus end assembly 106 is manufactured or fabricated typically depends on the relative rates of success of manufacturing or producing the Bragg grating 116, the cladding mode stripper 118 and the fiber cable connector 119 with the un-doped second passive optical fiber 122. In one embodiment the Bragg grating 116 is formed with the un-doped second passive optical fiber 122, then the fiber cable connector 119 is formed with the un-doped second passive optical fiber 122, and lastly the cladding mode stripper 118 is formed with the un-doped second passive optical fiber 122.

Before commencing manufacture or fabrication of the terminus end assembly 106, the length of the un-doped second passive optical fiber 122 should be sufficiently long enough to facilitate manufacturing of the partial-reflective fiber Bragg grating 116, the cladding mode stripper 118 and the fiber cable connector 119 on the same fiber as well as leaving a remaining amount of sufficient optical fiber to facilitate splicing of a leading end 125 of the terminus end assembly 106 with the rare-earth doped fiber 114. For example, the length of the un-doped second passive optical fiber 122 typically ranges approximately between 100 cm and 1,000 cm. In one example, the length of the un-doped second passive optical fiber 122, utilized to manufacture or fabricate of the terminus end assembly 106, is approximately 200 cm long.

The rare-earth doped fiber 114 is formed during a further step S3 of the method in which a doped optical fiber 124, e.g., an optical fiber 124 is doped with at least one of thulium, neodymium, ytterbium, erbium, praseodymium and holmium, is manufactured or fabricated. In one example the rare-earth doped fiber 114 is doped with thulium.

The high-energy fiber laser 102, as illustrated in FIG. 2, is assembled during step S4 of the method, by splicing the trailing end 123 of the pump end assembly 104 to a leading end 129, i.e., the upstream end, of the rare-earth doped fiber 114, in a conventional manner. Next, subsequently splicing, during further step S5 of the method, an opposed trailing end 131, i.e., the downstream end, of the rare-earth doped fiber 114 to a leading end 125, i.e., an upstream end, of the terminus end assembly 106. As is conventional in the art, the trailing end 123 and the leading end 125 of the pump and the terminus end assemblies 104, 106, respectively, are spliced to the respective leading end 129 and trailing end 131 of the rare-earth doped fiber 114 by conventional fusion splices 132, 134 which are diagrammatically shown in FIG. 2. The process of fusion splicing the ends of the fibers 120, 122, 124 of the pump end assembly 104, the rare-earth doped fiber 114 and the terminus end assembly 106 typically includes the steps of: stripping, cleaning, cleaving, and splicing the respective ends of the fibers to one another and thereafter testing and protecting the connections.

In more detail, the splicing process begins by preparing the mating ends 123, 129 of the fibers 120, 124 of the pump end assembly 104 and the rare-earth doped fiber 114, and preparing the mating ends 131, 125 of the fibers 124, 122 of the rare-earth doped fiber 114 and the terminus end assembly 106. This requires that all of the protective coatings, on the corresponding mating ends of the fibers 120, 122, 124, be suitably removed or rather stripped. Thereafter, the bare mating ends of the mating fibers 120, 122 and/or 124 are cleaned with an alcohol and wiped, being careful to ensure that moisture is not attracted to the bare mating ends. Subsequently, the mating ends of the fibers 120, 122, 124 are cleaved together using a "score-and-break" technique to ensure that the faces of the mating ends are perfectly flat and aligned perpendicular to the longitudinal axes of the fibers.

Next, a leading end 129 of the doped optical fiber 124 of the rare-earth doped fiber 114 and one end of one of the un-doped first and second passive optical fibers 120 or 122 of the pump end assembly 104 or the terminus end assembly 106 are aligned in the x, y, z planes by a fusion splicer apparatus such that, depending on the fusion splicer apparatus being utilized, the cores or the cladding of the doped optical fiber 124 and either the un-doped first or second passive optical fiber 120 or 122 are precisely axially aligned with one another. Once precisely aligned, the ends of the two aligned fibers 120 or 122 and 124 are heated and melted by a heating element and fused together with one another in a conventional manner to form a splice. The resulting splice 132 or 134 is then evaluated, for example, to ensure that the splice is sufficiently strong enough to withstand shipping, handling and/or extended use of the same without fracturing or becoming separated. Finally, the bare exterior surface of the fused fibers 122 or 120 and 124 is then protected by re-coating the bare surface(s) with a protective coating and/or a heat shrinkable membrane.

Then, a trailing end 131 of the doped optical fiber 124 of the rare-earth doped fiber 114 and an end of the other of the un-doped second and first passive optical fibers 122 or 120 of the terminus end assembly 106 or the pump end assembly 104 are aligned in the x, y, z planes by a fusion splicer apparatus such that, depending on the fusion splicer apparatus being utilized, the cores or the cladding of the doped optical fiber 124 and either the un-doped second or first passive optical fiber 122 or 120 are precisely axially aligned with one another. Once precisely aligned, the ends of the two aligned fibers 122 or 120 and 124 are heated and melted by a heating element and fused together with one another in a conventional manner to form a splice. The resulting splice 132 or 134 is then evaluated, for example, to ensure that the splice is sufficiently strong enough to withstand shipping, handling and/or extended use of the same without fracturing or becoming separated. Finally, the bare exterior surface of the fused fibers 120 or 122 and 124 is then protected by re-coating the bare surface(s) with a protective coating and/or a heat shrinkable membrane.

The fabrication of the pump end assembly 104 and the terminus end assembly 106, using a respective single length of the un-doped passive optical fiber 120, 122, reduces the overall number of splices required for assembling a high-powered fiber laser 102 while also expediting assembly of the same. Since the laser diode module 110 and the high-reflective fiber Bragg grating 112 are formed on a single strand of the un-doped first passive optical fiber 120 and the partial-reflector fiber Bragg grating 116, the cladding mode stripper 118 and the fiber cable connector 119 are formed on another single un-doped second passive optical fiber 122, and the rare-earth doped fiber 114 is formed on the doped optical fiber 124, the high-power fiber laser 102 only requires two separate splices 132, 134 in order to complete the manufacture of the high-power fiber laser 102.

In the industry, it is known that manufacturing or fabricating components, such as those discussed above, often times have different rates of success so to speak. For example, it may be easier to manufacture or assemble a first component than a second component or a third, and as such, the probability of manufacturing a first component, e.g., the pump diode 110, the cladding mode stripper 118 or the fiber cable connector 119, that meets industry standards is greater than the probability of fabricating a second component, e.g., the high-reflective fiber Bragg grating 112 or the partial-reflector fiber Bragg grating 116, that meets industry standards. In view of this, when manufacturing either the pump end assembly comprising first and second components, or the terminus end assembly comprising first, second and third components, it is beneficial to first manufacture the component which has the lowest rate of success or rather the lower probability of the meeting industry standards, i.e., the component which is more difficult to manufacture or fabricate. Thereafter, the assembly is completed by next manufacturing the component having the next higher rate of success or the higher probability of meeting the industry standards, i.e., the component which is easier to manufacture or fabricate. The manufacture or fabrication of the assemblies in this manner reduces waste, saves production time and manufacturing costs.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

I claim:

1. A method of manufacturing a high-power fiber laser having only first and second splices, the method comprising:
    forming a first assembly of at least two fiber optic components manufactured on a splice free, single, common first optical fiber, wherein the at least two fiber optic components of the first assembly consists of a single laser diode module and a high-reflective fiber Bragg grating;
    forming a second assembly of at least two fiber optic components manufactured on a splice free, single, common second optical fiber;
    forming a further fiber optic component on a splice free, single, third optical fiber;
    aligning a trailing end of the splice free, single, common first optical fiber with a leading end of the splice free, single, third optical fiber and connecting the trailing end of the splice free, single, common first optical fiber to the leading end of the splice free, single, third optical fiber with a first splice; and
    aligning a leading end of the splice free, single, common second optical fiber with a trailing end of the splice free, single, third optical fiber and connecting the leading end of the splice free, single, common second optical fiber to the trailing end of the splice free, single, third optical fiber with a second splice to form the high-power fiber laser having only first and second splices.

2. The method of manufacturing the high-power fiber laser according to claim 1, further comprising:
    defining the fiber optic components of the second assembly as being a partial-reflective fiber Bragg grating, a cladding mode stripper, and a fiber cable connector; and
    defining the further fiber optic component as being a rare-earth doped fiber.

3. The method of manufacturing the high-power fiber laser according to claim 2, further comprising:
    forming the first assembly of fiber optic components such that the single laser diode module is arranged upstream from the high-reflective fiber Bragg grating;
    forming the second assembly of the fiber optic components such that the partial-reflective fiber Bragg grating is arranged upstream from the cladding mode stripper, and the fiber cable connector is arranged downstream from the cladding mode stripper;
    connecting the first and the third optical fibers to each other with the first splice and connecting the second and the third optical fibers to each other with the second splice such that the single laser diode module, the high-reflective fiber Bragg grating, the partial-reflective fiber Bragg grating, the cladding mode stripper, the fiber cable connector, and the rare-earth doped fiber are arranged from an upstream end of the high-power fiber laser having only first and second splices to a downstream end of the high-power fiber laser in an order of: the single laser diode module, the high-reflective fiber Bragg grating, the rare-earth doped fiber, the partial-reflective fiber Bragg grating, the cladding mode stripper and the fiber cable connector.

4. The method of manufacturing the high-power fiber laser according to claim 3, further comprising connecting the first, the second and the third optical fibers such that only two splices are located in a flow of energy through the high-powered fiber laser from a leading end of the first optical fiber to a trailing end of the second optical fiber.

5. The method of manufacturing the high-power fiber laser according to claim 2, further comprising:
    forming the first assembly of the at least two fiber optic components by first, fabricating the high-reflective fiber Bragg grating on the splice free, single, common first optical fiber, and, subsequently, joining the single laser diode to the splice free, single, common first optical fiber; and
    forming the second assembly of the at least two fiber optic components by first, fabricating the partial-reflective fiber Bragg grating on the splice free, single, common second optical fiber, second, joining the fiber cable connector with the splice free, single, common second optical fiber, and, subsequently, forming the cladding mode stripper on the splice free, single, common second optical fiber.

6. A high-power fiber laser comprising:
    a first assembly of fiber optic components that are formed on a splice free, common, first optical fiber, wherein the fiber optic components of the first assembly consists of a single laser diode module and a high-reflective fiber Bragg grating, a second assembly of other fiber optic components that are formed on a splice free, common, second optical fiber, and a further fiber optic component that is formed on a splice free, third optical fiber;

a first splice integrally connects the splice free, common, first optical fiber to the third optical fiber to fix the first assembly of fiber optic components to the further fiber optic component; and a second splice integrally connects the third optical fiber to the splice free, common, second optical fiber to fix the second assembly of fiber optic components to the further fiber optic component, thereby forming the high-power fiber laser having only first and second splices.

7. The high-power fiber laser according to claim 6, wherein the second assembly of fiber optic components comprises a partial-reflective fiber Bragg grating, a cladding mode stripper, and a fiber cable connector, and the further fiber optic component is a rare-earth doped fiber.

8. The high-power fiber laser according to claim 7, wherein the single laser diode module, the high-reflective fiber Bragg grating, the partial-reflective fiber Bragg grating, the cladding mode stripper, the fiber cable connector, and the rare-earth doped fiber are arranged from an upstream end of the high-power fiber laser having only first and second splices to a downstream end of the high-power laser in an order of: the single laser diode module, the high-reflective fiber Bragg grating, the rare-earth doped fiber, the partial-reflective fiber Bragg grating, the cladding mode stripper, and the fiber cable connector.

\* \* \* \* \*